Aug. 24, 1943.  W. H. WARD  2,327,946
SAFETY COUPLER
Original Filed March 27, 1940   2 Sheets-Sheet 1
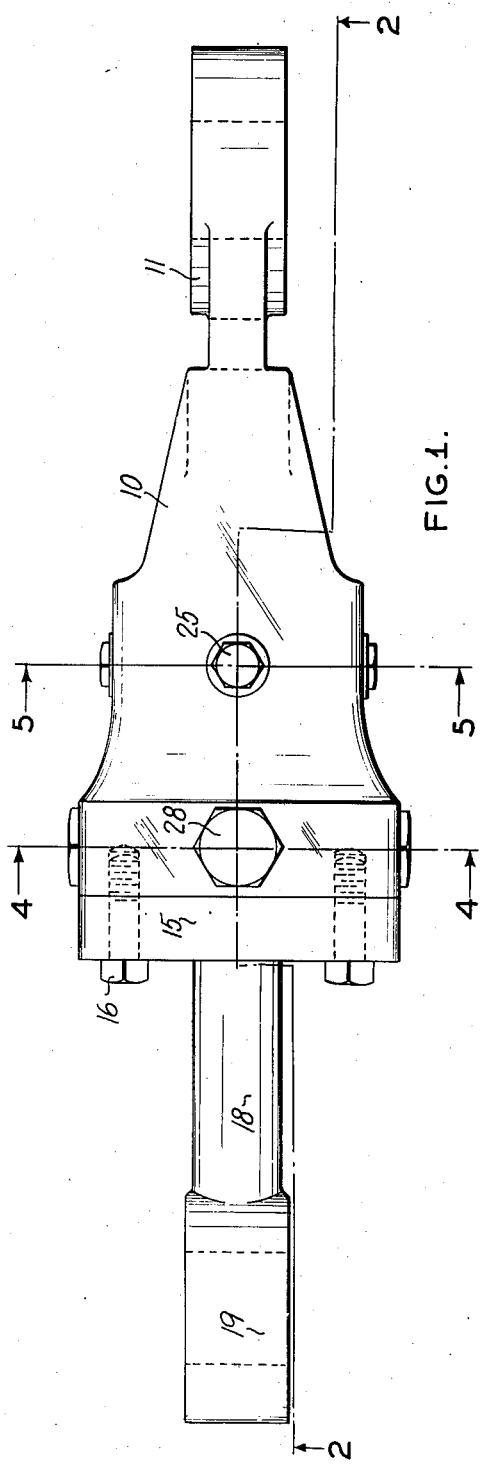
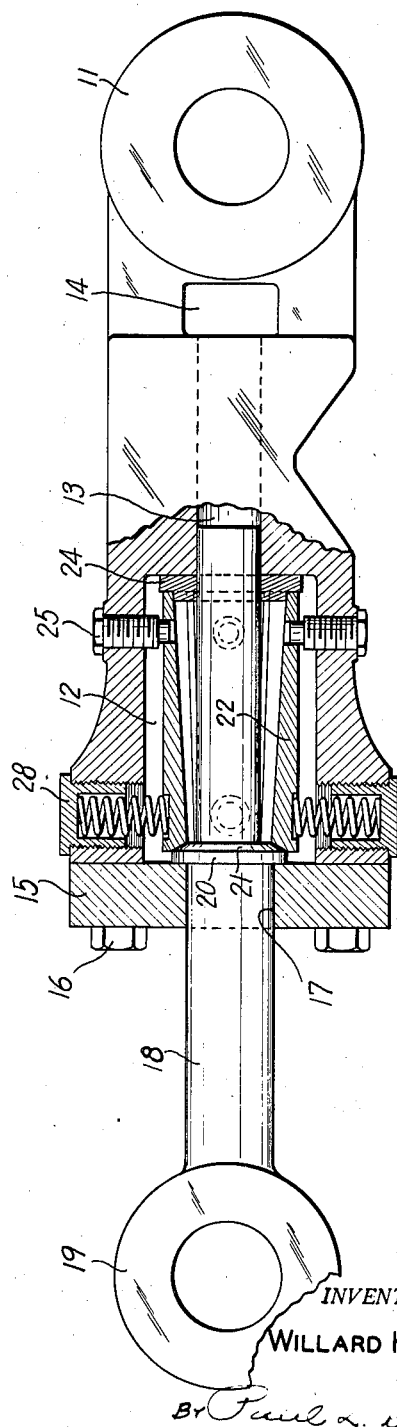
INVENTOR.
WILLARD H. WARD
ATTORNEY Aug. 24, 1943.  W. H. WARD  2,327,946
SAFETY COUPLER
Original Filed March 27, 1940  2 Sheets-Sheet 2

INVENTOR.
WILLARD H. WARD
BY
*Paul R. Krohn*
ATTORNEY

Patented Aug. 24, 1943

2,327,946

UNITED STATES PATENT OFFICE 2,327,946

SAFETY COUPLER

Willard H. Ward, St. Johnsbury, Vt., assignor to Fairbanks, Morse & Co., Chicago, Ill., a corporation of Illinois Original application March 27, 1940, Serial No. 326,137. Divided and this application April 11, 1942, Serial No. 438,563

7 Claims. (Cl. 74—584)

This invention relates to mechanical coupling devices in general, and particularly to improvements in power transmitting couplings for interconnecting driving and driven members of a machine. The present application is a division of my application filed March 27, 1940, for improvements in Hoppers, for which Patent No. 2,284,781 was granted June 2, 1942.

This invention has for its chief object the provision of an improved coupling device which will function to protect the machine against harmful strain and damage to its working parts in the event that the driven member thereof encounters inordinate resistance to its movement, and which, in such event, is self-acting to interrupt the flow of power between the driving and the driven members.

Another object of the invention is to provide a safety coupler of the character described, embodying means for varying its critical resistance, or maximum transmittable force value at which point the safety feature functions.

These and other objects and advantages will appear from the following description and accompanying drawings illustrating a preferred embodiment of my invention. In the drawings:

Fig. 1 is a plan view of my safety coupler;

Fig. 2 is a partly sectional side elevation thereof with the parts shown in their normal operating relationship;

Figure 3:
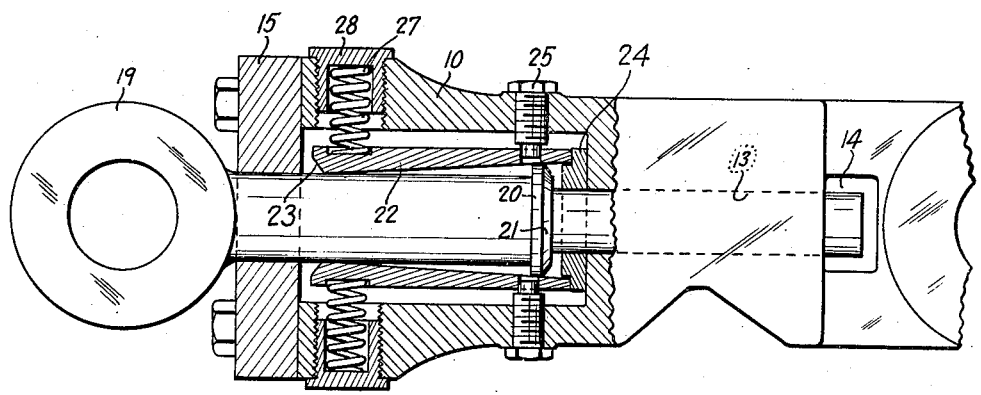
Figures 4, 5:
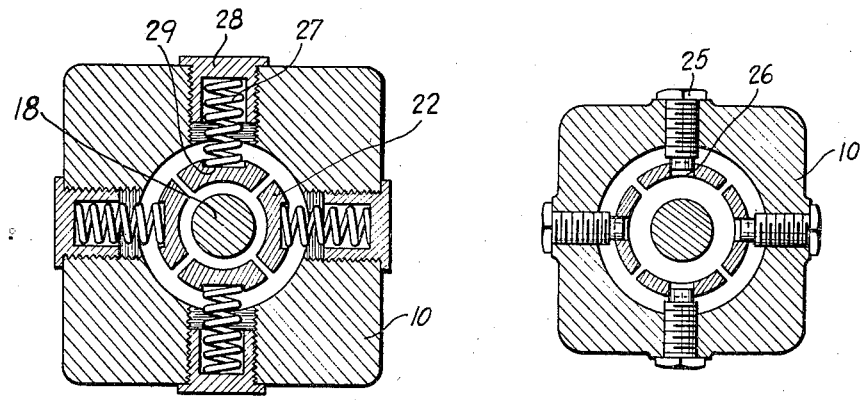

Fig. 3 is a view similar to that of Fig. 2 but illustrating the coupler parts in abnormal relative positions, and Figs. 4 and 5 are transverse sectional views taken at lines 4—4 and 5—5 of Fig. 2.

Referring now by characters of reference to the drawings, numeral 10 designates an elongated body member having an eye 11 formed thereon at one end to provide a journal for a pivot pin (not shown) by which the coupler body is adapted to be attached to a crank, rocker arm, or other power member of a machine. Extending inwardly from the opposite end of the coupler body is a cavity 12 that communicates with a longitudinal bore 13 terminating at an opening 14 at the base of the eye portion 11. An end plate 15 is secured as by bolts 16 to the coupler body and forms a closure for cavity 12, said end plate having an opening 17 coaxial with bore 13. A plunger rod 18 extends into the body through the opening 17, centrally through cavity 12 and into the bore 13. The outer end of the plunger rod is provided with a bearing block 19 or other suitable means for connection with a second power member of a machine.

Plunger rod 18 is provided with an annular shoulder 20, the inner face of which is bevelled as indicated at 21. The shoulder 20 limits the extent of axial movement of the plunger rod with respect to the body part of the coupler, and normally occupies a position of abutment against the inner face of end plate 15, as shown in Fig. 2. When thusly disposed the plunger rod is in a relatively extended condition and normally is so held by a sleeve 22 disposed about the rod and located in the body cavity 12. Sleeve 22 is quartered longitudinally and internally tapered as will appear from Figs. 2 and 4. One end of the composite sleeve has a bevelled throat 23 which normally seats against the correspondingly bevelled surface 21 of shoulder 20, and the opposite end of the sleeve fits an annular rabbet formed in a washer 24 which is disposed between the sleeve and the bottom surface of the body cavity.

The sleeve quarters are held in place in the body cavity by washer 24 and by studs 25 that extend radially in a transverse plan near the inner end of the sleeve, the studs being constituted by bolts threaded in the coupler body and projecting into openings 24 formed in the sleeve sections, one of such studs being provided for each section of the sleeve. The sleeve sections are loosely disposed on the studs to permit their outer ends to rock toward and from the plunger rod, which has the effect of expanding and contracting the diameter of the composite sleeve at its outer end.

Movement of the sleeve sections to effect an enlargement of the outer end of the sleeve, as aforesaid, is opposed by springs 27, each bearing radially inwardly against one of the sleeve sections at a point near its outer end. The springs 27 are seated in externally threaded cups 28 disposed in internally threaded openings in the body member, and extend into shallow pockets 29 formed in the sleeve sections. The described mounting for the springs enables the pressure thereof on the sections to be adjusted, such pressure determining the degree of force necessary to effect a longitudinal collapsing of the coupler.

As will be understood, the coupler illustrated and described herein is in the nature of a normally rigid compression link which is adapted to collapse longitudinally when subjected to compressive forces exceeding a predetermined value, applied to the end parts 11 and 19, such that the plunger 18 tends to move inwardly of the body part 10. Such movement of the plunger rod is normally prevented by the sleeve 22. However, should the compressive forces tending to collapse the coupler become excessive, the pressure of the bevelled shoulder 20 effects a laterally outward displacement of the bevelled ends of the sleeve sections, opposed by springs 27, and the shoulder 20 moves into the sleeve. Thus, when the coupler is subjected to abnormal compression the plunger rod moves independently of the body part to decrease the overall length of the coupler, and the movement of the plunger rod which is normally imparted to the body, and therethrough to a member of a machine which is connected in driven relation to the coupler, is taken up in the coupler. As will be understood, the coupler resets itself on the outward stroke of the plunger rod.

Although the invention has been illustrated and described with reference to a particular embodiment, it should be understood that changes may be made in the described structure without departing from the spirit and full intendment of the invention, except as limited by the appended claims.

What I claim and desire to secure by Letters Patent is:

1. A safety coupler of the character described, comprising a body, a rod slidable in the body and projecting outwardly from one end thereof, said rod having a shoulder normally bearing against an internal surface of the body to limit the extent of outward movement of the rod relative to the body, and yieldable means adapted to prevent inward movement of said rod relative to the body, said means comprising a longitudinally split sleeve disposed about said rod and held against endwise movement in the body, said sleeve having a bevelled end surface engaging said rod shoulder, and springs on said body bearing laterally on said sleeve and adapted to oppose diametrical expansion of the sleeve caused by the action of said rod shoulder on the bevelled end of the sleeve.

2. In a safety coupler of the character described, an elongate body, a rod disposed for longitudinal sliding movement in said body, said rod having a bevelled shoulder formed thereon, a longitudinally split sleeve on said rod within said body, means holding said sleeve against endwise movement in the body, said sleeve having a bevelled throat surface engageable with the bevelled surface of said shoulder, whereby an inward force on said rod relative to said body tends wedgingly to expand the bevelled end of said sleeve for the reception of said shoulder and spring means acting on said sleeve to resist expansion thereof as aforesaid.

3. A coupling device comprising a body member, a rod reciprocable in said body member, a longitudinally split sleeve in said body member, disposed about said rod, an annular flange on said rod, said flange having a bevelled surface abutting one end of said sleeve, said sleeve being expandable by the action thereon of said flange, to an internal diameter sufficient to accommodate said flange, springs acting on said sleeve to oppose expansion thereof, and means for adjusting the pressure of said springs on said sleeve.

4. In a coupling device of the character described, an elongated body, a rod reciprocable in said body and having an annular flange formed thereon, a longitudinally split sleeve fixedly disposed in said body and through which said rod extends, said flange being normally disposed in end-abutting relation to said sleeve whereby the rod is normally prevented from moving inwardly of said body, said flange having a bevelled portion coacting with the sleeve end to expand the same whereby to permit said flange to pass into the sleeve, and a plurality of springs, each bearing radially inwardly on one of the sleeve sections and adapted collectively to oppose expansion of said sleeve.

5. A coupling device of the character described comprising an elongated body terminating at one end in a bearing and having a recess extending inwardly from its opposite end, an apertured plate detachably secured to and forming a closure for the recessed end of said body, a plunger rod extending into the body through said end plate, said rod having a bearing on its outer end, an annular flange formed on said rod within the body recess, and means for holding said rod in an extended position with respect to the body, said means comprising a longitudinally split sleeve disposed in the body recess about said rod and having one end abutting said flange, said flange and sleeve end having mating bevelled surfaces whereby an inward force on the rod, and acting through said flange, tends wedgingly to expand the sleeve to allow said flange to pass therethrough, a plurality of springs acting against the sides of said sleeve and adapted to oppose sleeve expansion as aforesaid, and means for adjusting the force of said springs on said sleeve.

6. In a safety coupling device of the character described, a body member having a cavity extending inwardly from one end, an apertured end plate detachably secured over the mouth of said cavity, a plunger rod extending into said cavity through the apertured end plate, a bevelled shoulder formed on said rod, within the body cavity, a longitudinally split sleeve encircling the rod, within the body cavity, one end of said sleeve engaging said bevelled shoulder, recesses formed in the sleeve near the opposite end thereof, studs on the body member projecting into said recesses for positioning the sleeve, and a plurality of springs acting inwardly on said sleeve at points spaced from said positioning studs.

7. In a safety coupler of the character described, a body member having an end cavity therein, an apertured end plate secured over the mouth of said cavity, a plunger rod extending into said cavity through said plate, yieldable means in the body cavity normally holding said plunger rod against movement relative to the body, said means including a longitudinally split, laterally expandible sleeve encircling said rod and having a bevelled throat at one end, a flange formed on said rod, said flange being normally confined between the inner face of said end plate and the bevelled throat of said sleeve, radially arranged coil compression springs bearing inwardly against the sides of said sleeve adjacent the bevelled throat, spring compression adjusting cup elements threaded in the body member, said elements receiving the outer end of said springs.

WILLARD H. WARD.